(12) United States Patent
Primeaux et al.

(10) Patent No.: US 6,334,121 B1
(45) Date of Patent: Dec. 25, 2001

(54) USAGE PATTERN BASED USER AUTHENTICATOR

(75) Inventors: David Primeaux; Doraiswamy Sundar, both of Richmond; Willard L. Robinson, Jr., Alexandria, all of VA (US)

(73) Assignee: Virginia Commonwealth University, Richmond, VA (US)

( * ) Notice: Subject to any disclaimer, the term of this patent is extended or adjusted under 35 U.S.C. 154(b) by 0 days.

(21) Appl. No.: 09/266,735

(22) Filed: Mar. 12, 1999

Related U.S. Application Data

(60) Provisional application No. 60/084,131, filed on May 4, 1998.

(51) Int. Cl.[7] .................................................. G06F 15/18
(52) U.S. Cl. ................................................ 706/62; 706/52
(58) Field of Search .................................. 706/62, 16, 25, 706/26, 60, 52; 934/902

(56) References Cited

U.S. PATENT DOCUMENTS

| | | | | |
|---|---|---|---|---|
| 4,621,334 | * | 11/1986 | Garcia ................................... | 382/115 |
| 4,670,848 | * | 6/1987 | Schramm ............................... | 706/62 |
| 5,034,898 | * | 7/1991 | Lu et al. ................................ | 706/62 |
| 5,463,718 | * | 10/1995 | Maeda et al. .......................... | 706/52 |
| 5,465,308 | * | 11/1995 | Hutcheson et al. ................... | 382/159 |
| 5,621,889 | * | 4/1997 | Lermuzeaux et al. ................ | 713/200 |
| 5,724,488 | * | 3/1998 | Prezioso ................................ | 706/52 |
| 5,913,196 | * | 6/1999 | Talmor et al. ........................ | 704/270 |
| 6,047,279 | * | 4/2000 | Barrack et al. ....................... | 706/60 |
| 6,151,593 | * | 11/2000 | Cho et al. ............................. | 706/16 |

OTHER PUBLICATIONS

Brown et al.; "Practical Approach to User Authentication". 10th Annual Proceedings of the Computer Security Applications Conference, Dec. 1994, pp. 108–116.*

Lin, D.; "Computer–Access Authentication with Neural Network Based Keystroke Identity Verification". International Conference on Neural Networks, Jul. 1997, vol. 1, pp. 174–178.*

Obaidat, M.S.; "A Verification Methodology for Computer Systems Users". Proceedings of the 1995 ACM Symposium on Applied Computing, Feb. 1995, pp. 258–262.*

Monrose et al.; "Authentication via Keystroke Dynamics". Proceedings of the 4th ACM Conference on Computer and Communications Security, Apr. 1997, pp. 48–56.*

Held et al.; "Match–A New High–Level Relational Operator for Pattern Matching". Communications of the ACM, Jan. 1987, vol. 30, Iss. 1, pp. 62–75.*

Shepherd, S.J.; "Continuous Authentication by Analysis of Keyboard Typing Characters". European Convention on Security and Detection, May 1995, pp. 111–114.*

* cited by examiner

*Primary Examiner*—Mark R. Powell
*Assistant Examiner*—Kelvin Booker
(74) *Attorney, Agent, or Firm*—McGurieWood LLP

(57) ABSTRACT

A usage based pattern authenticator for monitoring and reporting on user usage patterns in an operating system using a set of security rules and user usage patterns. This computer system security tool authenticates users at the operating system level in multi-user operating systems. It supports system administrators in limiting the ability of unauthorized users to disrupt system operations using a neural network and set of rules to track usage patterns and flag suspicious activity on the system. The data collection mode collects and stores usage patterns of authenticated users. The training mode trains an artificial neural network and sets the interconnection weights of the network. The production mode monitors and reports on usage patterns, and optionally performs automatic responses when confronted with non-authenticated users.

19 Claims, 8 Drawing Sheets

USAGE PATTERN BASED USER AUTHENTICATOR

CROSS-REFERENCE TO RELATED APPLICATIONS

This application is a continuation-in-part of provisional patent application Ser. No. 60/084,131 filed May 4, 1998, the subject matter of which is incorporated herein by reference.

BACKGROUND OF THE INVENTION

1. Field of the Invention

The present invention generally relates to computer system security and, more particularly to, authenticating users at the operating system level in multi-user computer systems. It supports system administrators in limiting the ability of unauthorized users to disrupt system operations by using a neural network and set of rules to track usage patterns and flag suspicious activity on the system.

2. Background Description

Multi-user operating systems often have holes in their built-in security measures that can allow access by unauthorized users. The UNIX operating system (OS) will be used to illustrate the state of operating system security issues; however, these problems exist in varying degrees for many state-of-the-art operating systems, today. (UNIX is a registered trademark of SCO.)

The UNIX operating system, though used extensively in all kinds of environments, was not really designed with security in mind. See "On the Security of UNIX" by Dennis M. Ritchie (reprinted in UNIX System Manager's Manual 4.3, Berkeley Software Distribution, University of California, April 1986). The need for greater security arose in the early 1980's when Universities moved their UNIX systems from laboratories to computer centers and many business and Government institutions started installing UNIX systems. Additional features such as remote login, remote command execution, file transfer, electronic mail and networking have made operating systems more complex. Moreover, massive connections of UNIX systems to the Internet have opened more possibilities of security attack on these systems.

FIG. 1 shows a block diagram of a UNIX system server 102 connected to both a Local Area Network (LAN) 103 and the Internet 104. The LAN 103 includes a plurality of client workstations 105i to 105n which access the system server 102. Additional client workstations 106i to 106n also access the system server 102 via the Internet 104. The system server 102 includes a data storage device 107, such as one or more mass storage devices, storing databases and other information which may be accessed by a workstation, either via the LAN 103 or the Internet 104.

Security is one of the biggest concerns for Open systems like UNIX systems. As the systems and tools become more secure, the hackers or persons intent on "breaking" into the systems become even more knowledgeable. If a UNIX system has connectivity outside of a "trusted" network (i.e., the LAN 103), for instance when connected to the Internet 104, various security barriers have been devised, as generally indicated at 108. Such barriers are known in the art as "firewalls". However, these security barriers can be breached.

Security problems can result in costly disruptions from normal operations and/or the loss of private or proprietary data through destruction or theft. Depending on the importance of the data, its loss or theft may pose personal, business, national or international threat. While the extent of damage could be minimized by using various measures, the optimal solution would be to prevent any intrusion or break-in or at least minimize the damage if an intrusion should occur.

The goals of computer and network security are threefold:

Integrity of data—deals with preservation of contents against all unauthorized change.

Privacy of information—relates to restricting access to objects only to authorized persons.

Availability of computer resources—implies that all authorized users have access to the system for legitimate use.

Typically, a process of authentication restricts user access to a computer system. All modern computing systems that have capabilities for multiple users have a means of identifying who is using the computer at any given time. User authentication is typically implemented in the form of password protection for a system. Password protection is, however, a weak defense. Passwords that are not randomly generated, can often be easily cracked. Passwords that are randomly generated pose a different threat because they are often written down, so as not to be forgotten.

Security problems arise when someone breaks into a system using a legitimate user identification (ID) with the intent of doing illegitimate activities. In the UNIX OS, for instance, a special user (root) is used for administrative purposes. Anyone gaining access to a root account ID can bypass all security restrictions within the system. In the UNIX OS, the finger or who commands are typically used to determine who is logged on.

These commands return the account IDs (userids) of all persons presently logged on. Currently, the system administrator 101 has no way to verify that the person who is using a particular ID is in fact the owner of the ID.

SUMMARY OF THE INVENTION

It is therefore an object of the invention to provide support to system administrators in limiting the ability of unauthorized users to disrupt system operations by monitoring and reporting abnormal user usage patterns.

The present invention is a method that will prevent a destructive command from being executed. Several commands for each of the system users are tracked. A combination of security rules and user usage patterns are used to flag suspicious activity on the system. Security rules are centered around those types of commands that are potentially destructive in nature and take into account the user's normal level of access privileges. For example, if a typical user tries to assign himself "super user", or root, privileges, the security rules catch this and take appropriate action to limit further damage. The attempt is then logged to a system security file that the system administrator will review or other appropriate action is taken automatically. A unique advantage of the invention is that it can prevent previously authorized users from executing destructive commands by detecting unusual patterns in their usage of the system.

It is another object of the invention to incorporate machine learning techniques into the method.

An artificial neural network learns a user's usage patterns and integrates these with the security rules. The neural network will recognize normal usage patterns for a particular user. When the commands do not follow the normal usage pattern, the commands used will be checked against the systems's security rules. For example, should someone steal a userid and password, and start using commands in a pattern unusual for the legitimate user, the present invention will detect a difference in the pattern of command usage. When such a difference is detected, it will be compared to the set of security rules and the system will take the appropriate action. All of the activity of the security rules will be logged for the system administrator's review.

The implementation of the security system in the present invention is invisible to the user. Users will not know that their command usage pattern is kept on the system and updated by a neural network. The neural network technology is such that the exact usage patterns stored therein are indecipherable, even to the most determined intruder. To make the system even more invisible, the commands that are captured by the system are encoded before running them through the neural network and the security rules. While files to do this are hidden in the user's directory, the contents of these files contain only encoded information and so users are not able to view them. The files to run these can only be changed by the system administrator. This system also may have two or more threshold levels for security monitoring: one for normal operations and any number for heightened security.

According to the invention, a user's normal usage pattern is learned by an artificial neural network and then used to detect abnormal activity. It reports on unusual happenings which may be very helpful in detecting unauthorized use of the system. If there is sufficient need, the system can be implemented to automatically alert the system administrator, block further logins from the suspected intruder, or take some other action automatically. No known system uses this approach in the prior art.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

For an administrator monitoring a computing system and logged on users, an "intruder" appears as a normal user, because the ID used is that of a real user. The activities of the imposter may not match those of the typical user. For instance, once into the system, the intruder may try to acquire more privileges, like root access in order to gain control over the system. The present invention is a method for system administrators to verify that the person who is using a particular ID is in fact the owner of this ID. It is meant to act as a security tool that enables the system administrator to identify a suspected breach of security. It monitors command usage and tries to identify the user based on past command usage patterns.

It is asserted, and has been empirically shown during testing of the prototype invention, that over a period of several logins, UNIX system users will demonstrate some pattern in initial shell command usage. It is also asserted that the first n commands are enough to identify a unique usage pattern. Initial study has shown that n=5 commands falls within a normal pattern. Moreover, although possible to collect 20 or 30 shell commands, we would not want to give an intruder 20–30 commands before challenging the usage pattern.

Over a period of several logins, a user's usage pattern is captured in the user's history files. This data is used to train an Artificial Neural Network (ANN) so that, given a usage pattern, it will return the identity of a user. In addition, all important commands in UNIX are identified and some classified as critical. When a user uses a critical command, that activity is also captured and the information reported. Based on this information, appropriate action may be taken. The set of critical commands may be tailored to meet the needs of the system administrator at a specific site.

Through modification of the edge weights, a three-layer ANN can be made to approximate any computable function, with the function inputs represented as activation levels for the input nodes (the input layer), and function output read as activation levels for that set of nodes in the ANN's layer designated as the output layer.

Designating the input layer of such an ANN as "1," the output layer as "3," and the other (hidden) layer as "2," a feedforward ANN is one in which the direction of each edge is from a lower-numbered layer to a higher-numbered layer. Each layer is fully connected to its neighboring layer(s).

Figure 1:
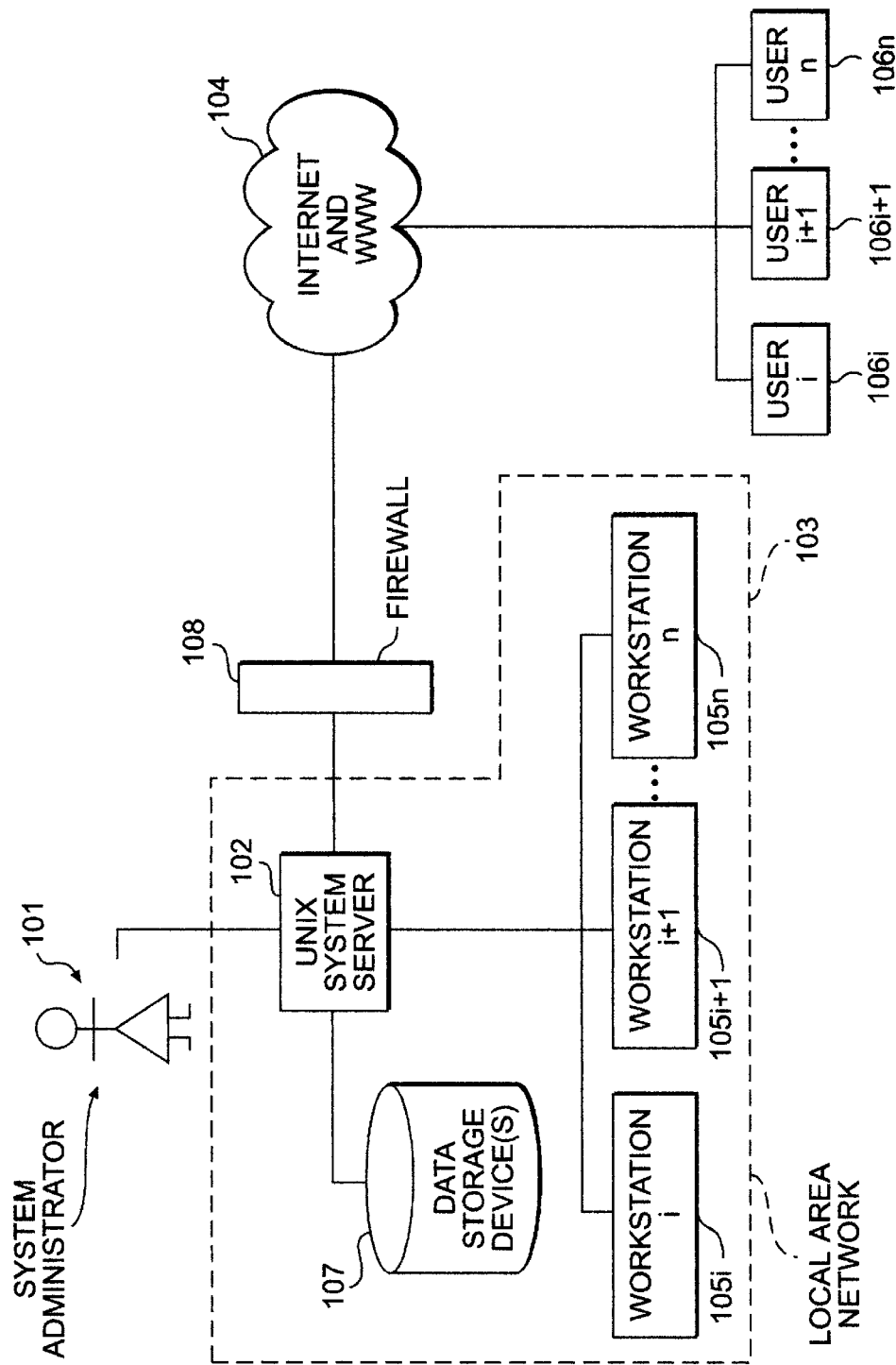
FIG. 1 is a block diagram of a UNIX-based local area network (LAN) connected to the Internet.
Figure 2:
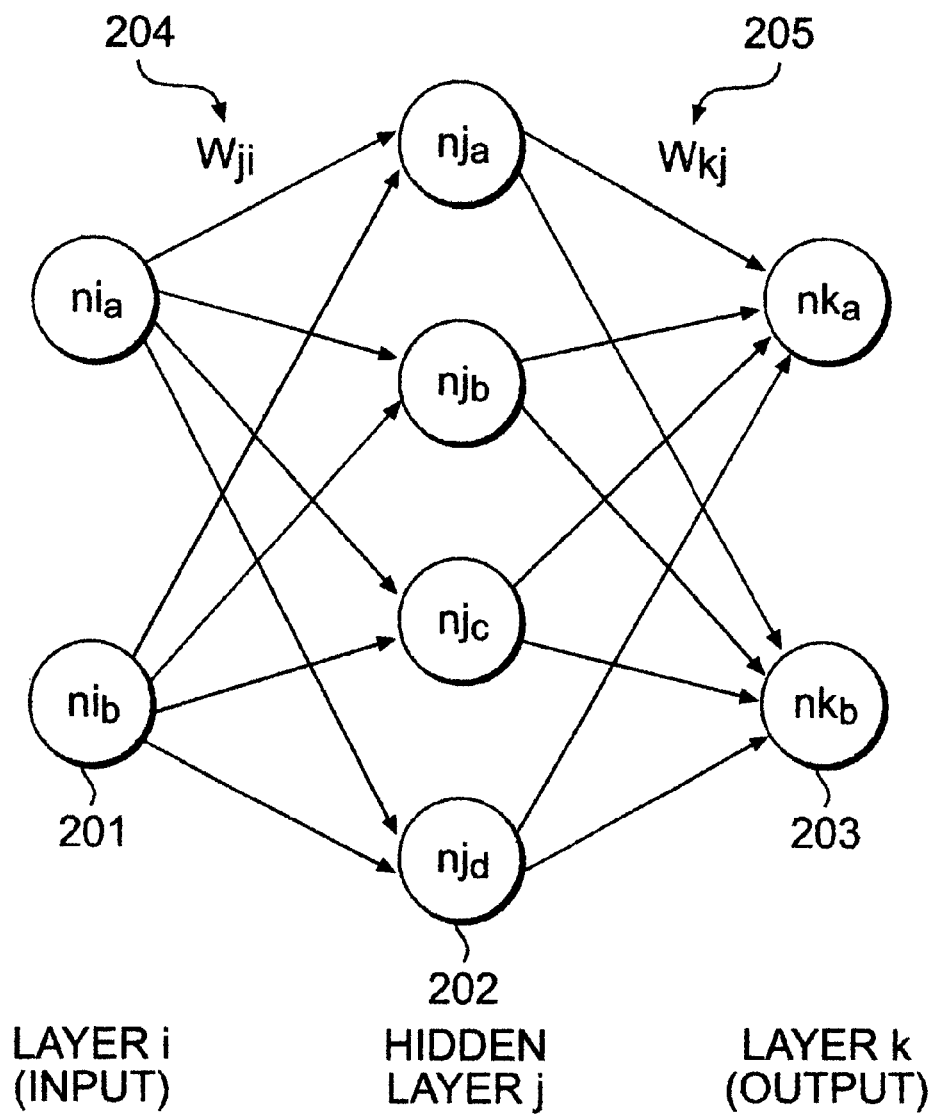
FIG. 2 shows a three-layer feedforward ANN architecture represented by a directed graph.

FIG. 2 illustrates the architecture of a feedforward ANN with two nodes $nl_a$ and $nl_b$ in input layer i 201, where i=1; four nodes $nj_a$, $nj_b$, $nj_c$, and $nj_d$ in hidden layer j 202; and two nodes $nk_a$, $nk_b$ in output layer k 203. The edge weights from layer i are shown as $w_{ji}$ 204 and are directed from layer i to layer j. The edge weights from layer j are shown as $w_{kj}$ 205 and are directed from layer j to layer k. The input values for the nodes in layer i 201, when represented as a vector, are known as the input vector. The output values for the nodes in layer k 203, when represented as a vector, are known as the output vector. The input and output vectors for an ANN are often referred to as the input-output vector pair. If the ANN has only one hidden layer, j=2, and output layer k=3, then it is a three-layer ANN.

One known ANN learning method can be implemented as a back-propagation algorithm. Back-propagation is effected by collecting a set of known input-output vector pairs for the function to be learned. This set of vectors is used to "train" the ANN as follows.

Initially, randomly generated weights are distributed on the ANN's edges 204 and 205, which in mathematical terms, equates the weights with the edges. Then an input vector from the set of known input-output vector pairs is introduced as input to the ANN as activation levels for the nodes 201 in layer 1. The layer 2 nodes use the weights $w_{ji}$ on the edges 204 connecting them to the layer 1 nodes $n_{Ia}$ and $n_{Ib}$, along with the activation levels of the layer I nodes 201 to compute their own activation levels (202). Finally, output layer 3 nodes 203 use the weights $w_{kj}$ 205 on the edges connecting them to the layer 2 nodes 202, along with the activation levels of the layer 2 nodes 202 to compute their own activation levels 203. After the first input vector is introduced to the model, the next input vector is so introduced, until all input vectors have been introduced to the model. The period between the introduction of the first input vector until the introduction of the final input vector is called an epoch.

Recall that the set of vectors used for this training consist of input-output output vector pairs. The output vector paired in that set with the input vector previously introduced as input to the ANN is compared with the activation levels of the output nodes. If the differences between the activation values for these nodes and the values in the output vector are within a pre-determined tolerance, the weights on the interconnecting edges approximate the function to be learned. Otherwise, very small adjustments are made to the ANN's interconnecting weights. The steps in the epoch are all repeated using the same input-output vector pairs for a predetermined count of epochs.

When the ANN has been so trained on all available input-output vector pairs, the ANN has learned the function that maps the input vectors to the output vectors. For a more detailed description of ANNs and their implementation, see C++ *Neural Networks and Fuzzy Logic*, second edition (New York: MIS Press, 1995), by V. B. Rao and H. V. Rao (hereafter referred to as C++ *Neural Networks*) or *Pattern Recognition and Neural Networks* (Oxford Cambridge University Press, 1996), by B. D. Ripley.

Although the present invention is described as an implementation for a UNIX operating system, we assert that given analogous system tools, it can be easily implemented on other operating systems.

The present invention relies on the premise that users'system usage will display a pattern of behavior. Based on the presence of a pattern, a neural network can be employed to capture and subsequently identify the pattern. The identification of a particular user is a classification type problem. The specific classification involved here is whether the pattern falls within the class of authorized system users.

Due to the nature of the problem, and previous research into ANNs, the present invention uses a feedforward network with a standard back-propagation algorithm to learn a function. The standard algorithm is tailored for the present invention in the following ways. We use a 7-15-4 architecture. This means that there are seven input nodes (layer 1), 15 nodes in layer 2, and four output nodes (layer 3). The seven encoded inputs for layer 1 consist of five shell commands, a three-valued variable used to store the time period (shift) during the day, and the day of the week. The four output nodes are a binary encoding of the userid. In testing we used a 4-bit encoding and the present discussion will describe this architecture. An 8-bit encoding would be used for systems with up to 255 users, which results in a 7-15-8 architecture. A learning rate, to be discussed later, of 0.01 over 50,000 epochs is used to train the ANN. The initial edge weight values, also to be discussed later, range from −0.1 to 0.1. All inputs to the ANN are encoded and the inputs are scaled to a range between 0.1 and 0.9.

Another advantage in using an ANN in the process, is that an ANN provides additional security inherent in its distributed memory. When a network is trained, the information regarding usage patterns is represented by neural network interconnections or synaptic weights. Thus, the information is not available in clear text files which could be easily viewed by intruders on the system. Moreover, the present invention could be implemented to actually run in parallel with an add-in neuro-computer board that plugs into the system bus. In this way, the massively parallel properties of the ANN could be taken advantage of more fully rather than just being simulated with software.

Figure 3:
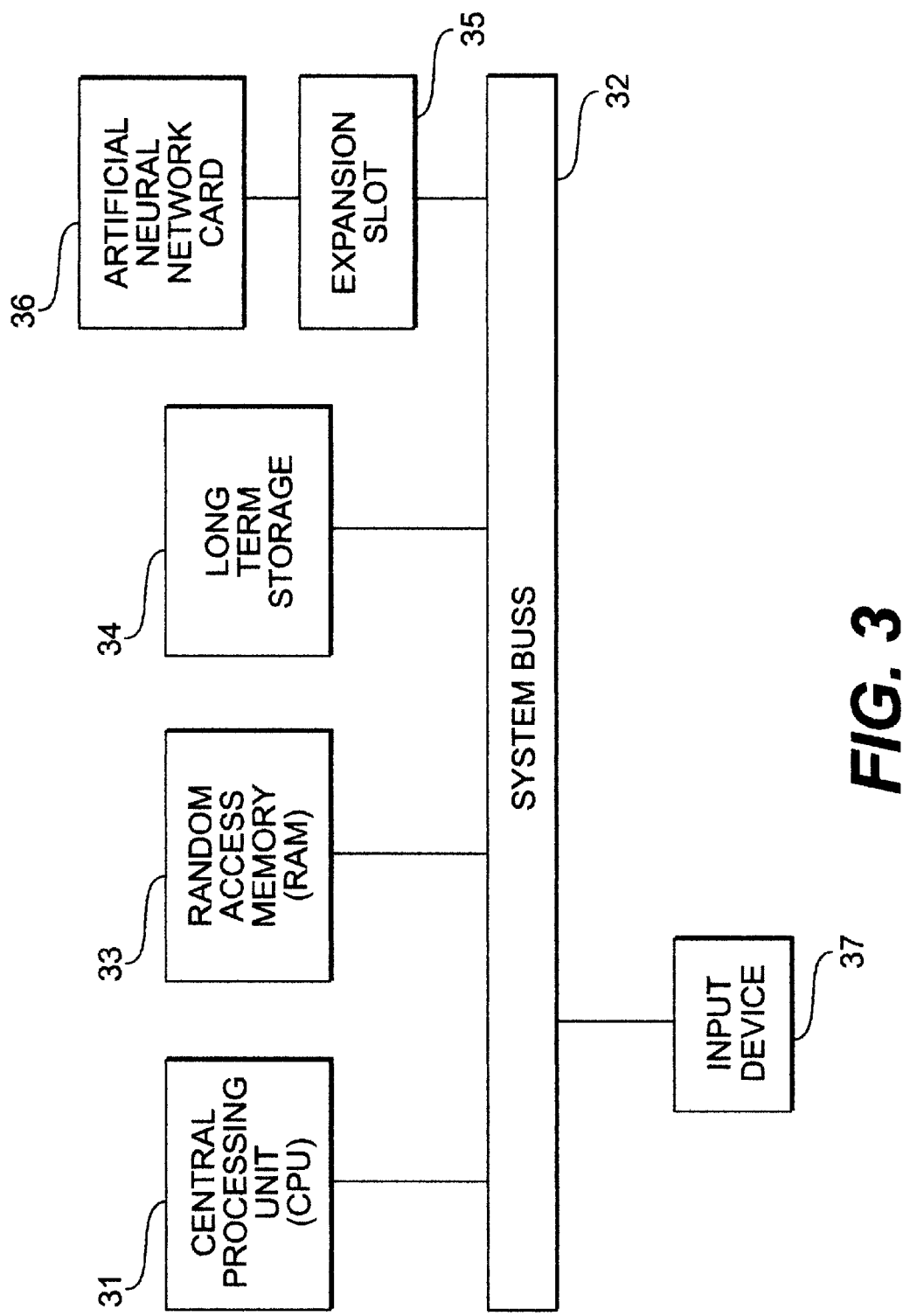
FIG. 3 is a block diagram showing a neuro computer expansion card installed in a computer implementing an ANN.

FIG. 3 shows a possible hardware implementation of a neuro computer expansion card installed into a computer. This card must be specially designed to implement the ANN architecture. It would however, be installed in a fashion similar to a common expansion card. One skilled in the art could easily modify the present invention to take advantage of the parallel properties of this custom hardware add-on.

It is a well-known result that a process implemented through computer software has an equivalent implementation through computer hardware. This result applies to this invention. That is, a hardware implementation of the ANN will produce the same result as does the software described here. Referring to FIG. 3, a possible hardware implementation of the training and production modes of the invention, as fully described later, would operate generally as follows.

In the training mode, user table information in long-term storage (e.g., disk storage) 34 is retrieved as needed, moved along the system buss 32 and placed in random access memory (RAM) 33. Processing begins when the central processing unit (CPU) 31 sequentially sends information for each user along the system buss 32 through the expansion slot 35 and to the Neural Network Card 36 for training. When data from all users has been introduced in this manner to the Neural Network Card, one training epoch has passed. The processing repeats for 50,000 epochs.

In the production mode, user table information in long-term storage 34 is retrieved as needed, moved along the system buss 32 and placed in random access memory 33. Processing begins when the central processing unit 31 sends this information along the system buss 32 through the expansion slot 35 and to the Neural Network Card 36. Thereafter, copies of user commands input through some input device 37 such as the keyboard are delivered through the system buss 32 directly to the Neural Network Card 36 for processing. If processing results call for some action such as notifying the system administrator, these can be initiated directly from the Neural Network Card 36.

In order to accomplish the objectives of the present invention, its implementation is segmented into three modes: data collection, training and production. We will discuss each mode separately and describe their interrelationship.

Figure 4:
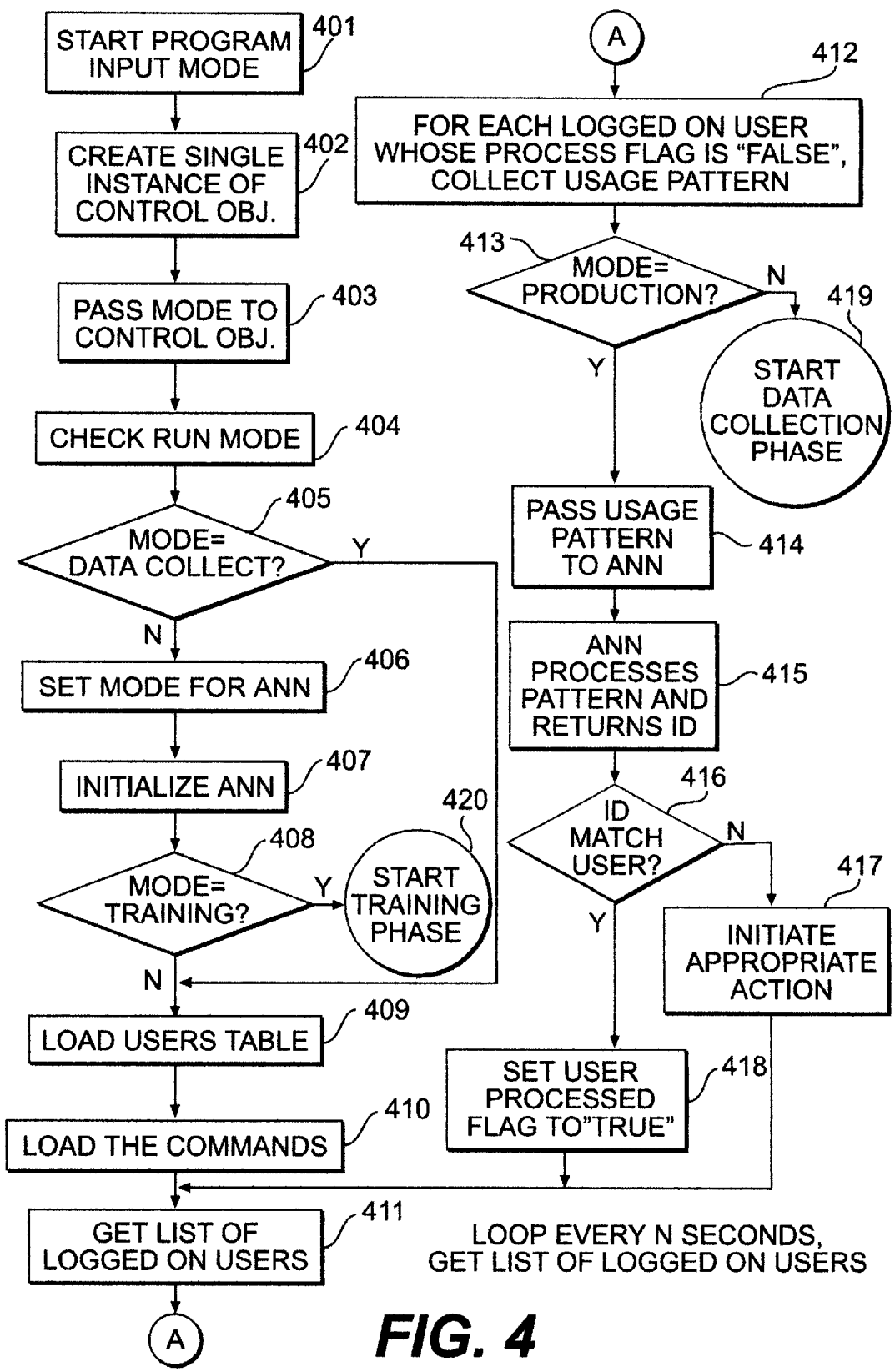
FIG. 4 is flow diagram of the general method for Usage based pattern authentications.
Figure 6:
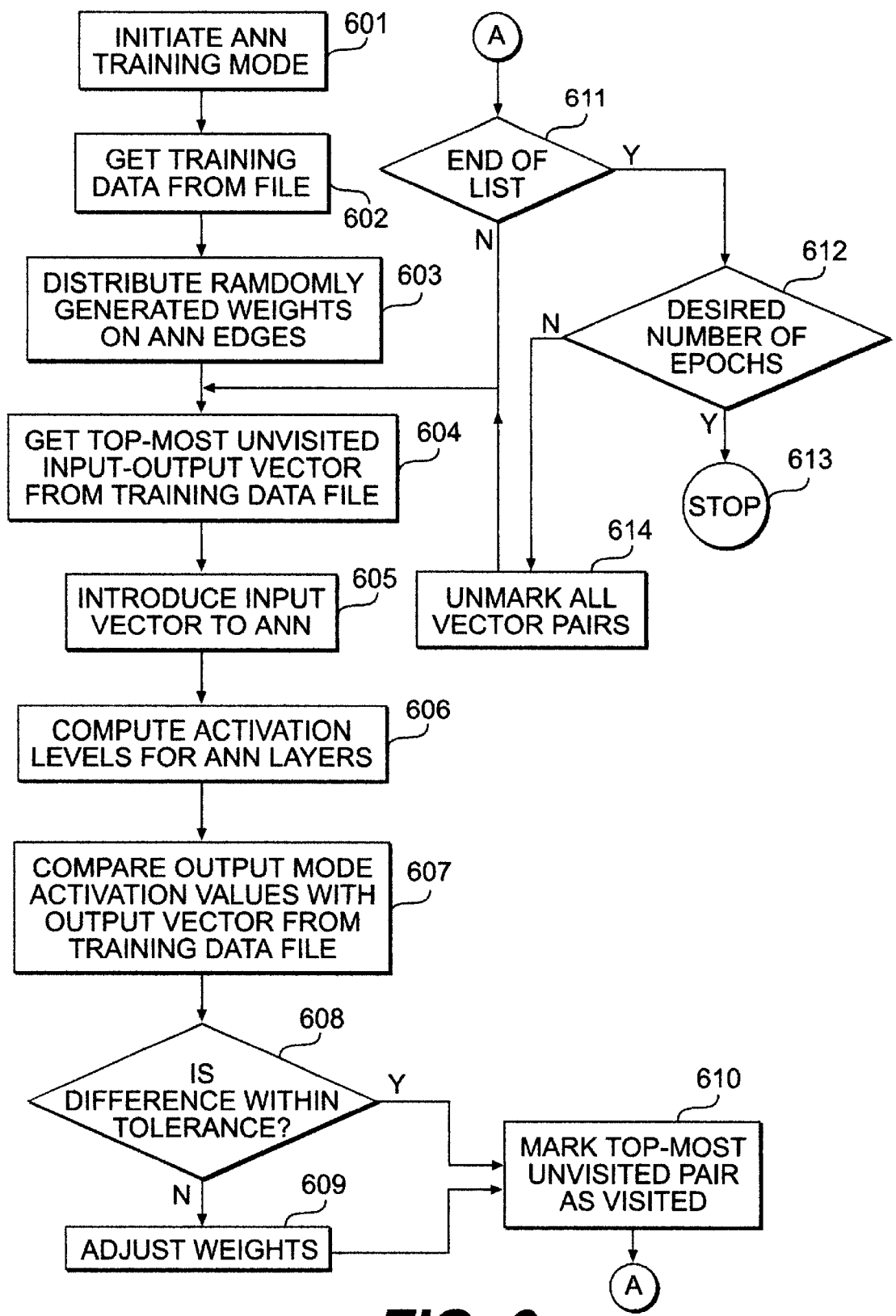
FIG. 6 is a flow-diagram of artificial neural network training.

The prototype of the invention was implemented using object-oriented design, and the following discussion will describe that implementation. Referring to FIG. 4, the process initiation is shown in block 401. A single instance of a control object is created in function block 402, and the mode (data collection, training, or production) is passed to the control object in function block 403. The run mode is checked in function block 404, and a test is made in decision block 405 to determine if the mode is "data collect" mode. If so, the process continues at function block 409; otherwise, the mode is set to Artificial Neural Network (ANN) mode in function block 406. The ANN is initialized in function block 407, and then a test is made in decision block 408 to determine if the mode is "Training" mode. If so, the training phase begins as shown in FIG. 6. If not, the process continues at function block 409.

Figure 5:
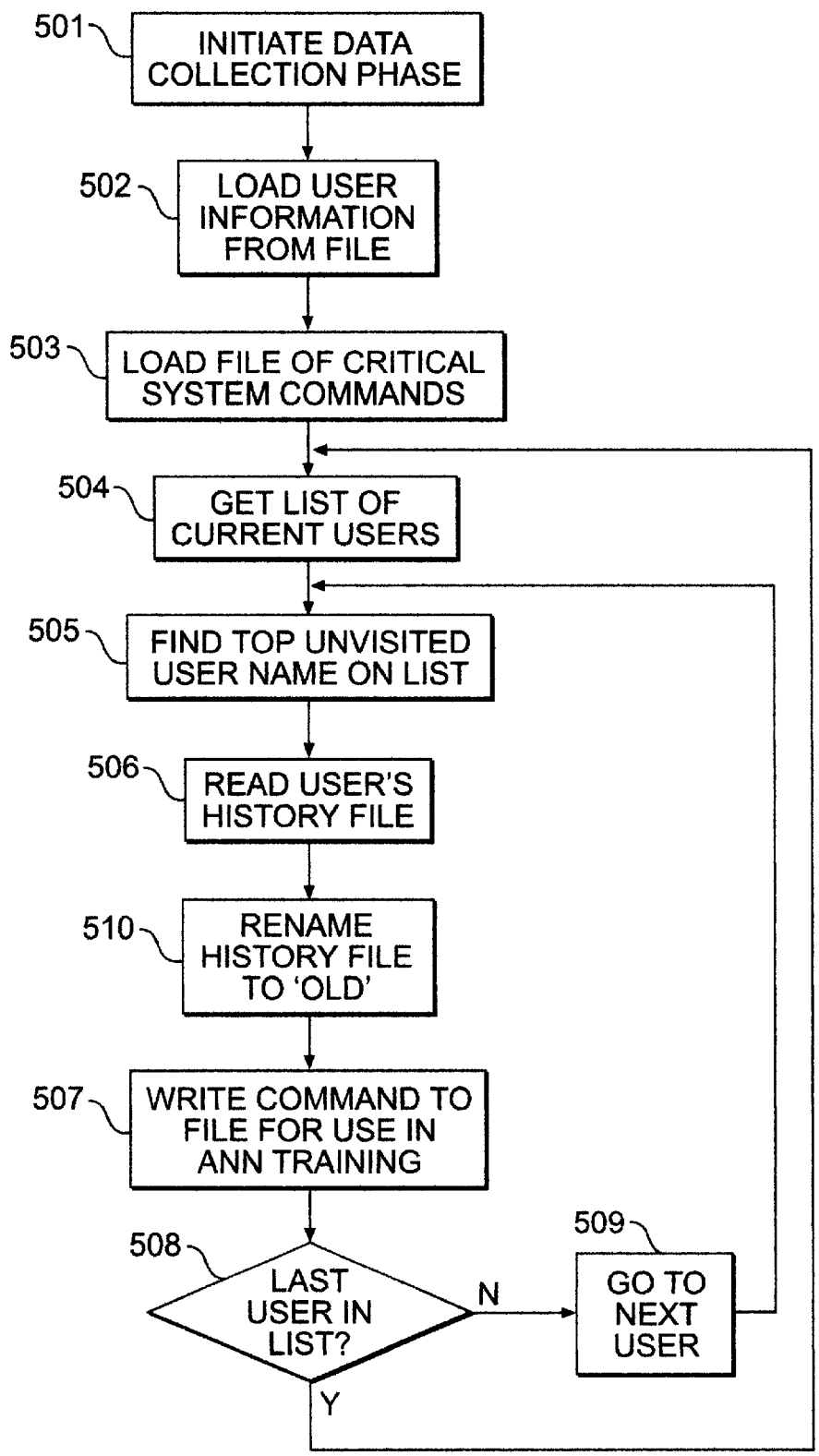
FIG. 5 is a flow diagram of the data collection phase.

In function block 409, the users table containing user-specific information such as userid, full name, home directory, etc., is loaded. This is followed in function block 410 by loading the encoded list of commands before the processing loop is entered. To simplify processing, text inputs (such as the user's name or a UNIX command) are assigned a unique integer value. So as not to bias the processing in the ANN in favor of the larger integers, all inputs are scaled to a range between 0 and 1. At output, the results are re-scaled to their original magnitudes. The first step in the processing loop is to get the list of logged on users in fiction block 411. Then, for each logged on user whose "Processed Flag" is false, their usage pattern is collected in function block 412. A test is then made in decision block 413 to determine if the run mode is "Production". If not, the process continues with data collection as shown in FIG. 5; otherwise, the usage pattern is passed to the ANN in function block 414. The ANN processes the pattern and returns an ID in function block 415. A test is made in decision block 416 to determine if the ID matches the user. If not, appropriate action is initiated in function block 417; if so, the user processed flag is set to "true" in fiction block 418. The process then loops back to function block 411, authenticating the next list of logged in users. The process runs in a continuous loop as a background process, or daemon, and requires system administrator action to terminate. A more detailed description of each phase follows.

Data Collection Phase

FIG. 5 shows a flow diagram of the Data Collection phase. In this mode, at least ten sessions of usage patterns, consisting of five user commands each for the different users, are collected by copying data from the user's UNIX history file (function block 506) and results stored in a file. The data collected in this phase will be used as input to the ANN.

We have seven independent variables to collect: day-of-week, and time-of-day (determined by use of the finger command using shell script in function block 504), and five shell commands. We also capture the userid, as a 4-bit binary coding, remembering that 8-bits is used for a system of up to 255 users. The data collection is continued until sufficient numbers of logins have occurred per user and the data is stored with the information identifying the particular user in a common file with all the system users (function block 507). The data for one user and one logon session constitutes one training case for the ANN. Each subsequent training case causes a new history file to be created and one version renamed to 'old'(function block 510). This duration may vary depending on the nature of the users, but should likely be collected over two to four weeks.

Referring again to FIG. 5, this mode is commenced by the system administrator in fiction block 501. User information is loaded from a file in function block 502 in order to instantiate an object for each user. Then the list of encoded labels for critical system commands are loaded from a file in function block 503. One should note that this file may be modified by the system administrator to effect a heightened or reduced level of security, with no need to reprogram or recompile the application. The UNIX finger command is used in function block 504 to get the current list of users logged in to the system. In function block 505, the top-most unvisited userid on the list of current users is found. In function block 506 the current user's .sh_history file is read. Each subsequent training case causes a new history file to be created and one version renamed to 'old'in function block 510. The information is then saved by writing the contents of the .sh_history file and date/time information to a file for later use by the ANN training phase in function block 507. Each shell command is assigned a unique integer identifier. Thus, the data is encoded and stored as integers. A test is used to determine whether this user is the last user on the list of current users in decision block 508. If so, the process branches back to function block 504 and begins the process again with a new list of current users. If the last user has not been processed, the current user in the list is marked as visited in function block 509 and processing continues with the next user on the list in function block 505. This process runs as a continuous background process, or daemon, and requires system administrator action to terminate. Once the data collection phase is complete, training of the ANN can begin.

Artificial Neural Network Training Phase

An advantage of the present invention is that it uses machine learning in the form of an Artificial Neural Network (ANN) to learn the normal shell command usage pattern of a system's authorized users. By gathering information from previous usage, the ANN can develop a profile of pattern for each user from which it can then closely monitor the entire system simultaneously. The prior art shows no previous research in using neural networks to learn command usage patterns for security.

Although artificial neural networks (ANN) are well known to those skilled in the art of machine learning, we will discuss ANN architecture, as well as its advantages in some detail in order to provide a framework for our implementation of the present invention.

Neural networks are strictly used as mathematical models that are composed of a large number of processing elements and are organized into layers. Given enough processing elements in a hidden layer they can arbitrarily approximate any function. Through their dynamic state response they form a functional relationship between a set of inputs and a set of target outputs. These pairs of inputs and outputs are used to train the network. Based on the actual output of the network versus the target output, the learning mechanism in the network adjusts the internal model by adjusting the interconnection weights between the processing elements.

Neural network architecture deals with how many layers are in the neural network, how many processing elements are in each layer and how they are connected. The present invention consists of a three-layer, fully connected feedforward network (i.e., every node in a layer is connected to every node in the next layer). It learns by using a standard back propagation technique at a learning rate of 0.01 over 50,000 epochs of training. The input layer (layer 1) consists of seven nodes and inputs to this layer are scaled to a range between 0.1 and 0.9. Layer 2 and Layer 3 (output layer) consist of 15 and four nodes, respectively. Nodes in each layer are fully connected to nodes in the next layer. The initial random edge weight values for training range from −0.1 to 0.1. These parameters have been optimized for a system with eight users and in practice, may need to be adjusted based on the actual number of users and the amount of data collected for each.

The simple processing elements associated with the network perform the following:

evaluate input signals determine strength of each input calculate total input signal and compare to the threshold level determine the output value Various constructs are used to accomplish these tasks.

In order to implement the present invention, a known model of an ANN written in the C++ language, as presented in C++ Neural Networks, has been customized. The modifications entail altering the interactive interface to the ANN of the known model so that it executes non-interactively, or in the background. This modification permits the program to be embedded within the remaining portions of the process described in the present invention.

The method of training used in the present invention is supervised; the outputs for the exemplars are provided by the output vector from the input-output vector pair. Formatting of the outputs as distributed binary representations as opposed to integer representations was done to achieve better performance in the classification function of the ANN. The generalized delta rule is employed for use in the back propagation supervised learning. The scale parameters were set between 0.1 and 0.9; network weights were initialized to between −0.1 and 0.1; and the learning or training rate is set to 0.01. Although the system was tested with {29, 10, 50, 5, 15, 20, 17, and 13} hidden nodes used in the network, empirical data showed that 15 hidden nodes in layer 2 provided better performance, with a hit rate of 90% or higher for both the training and validation sets.

The system takes the output vector from the data collection phase, as a file, and does a forward pass of each exemplar through the ANN component, as described in detail below.

FIG. 6 shows a flow diagram of Artificial Neural Network (ANN) training. The training mode commences in function block 601. Training data is obtained from a file in function block 602. The ANN edge weight values are initialized in function block 603 to random values ranging from −0.1 to 0.1. The top-most unvisited input-output vector pair from the training file is read in function block 604. The input vector from the pair is scaled and introduced as an input value to Layer 1 of the ANN in function block 605. On output, these values are re-scaled back to their original magnitudes. Activation levels for nodes in the other ANN layers are computed in function block 606 as described below.

Figure 7:
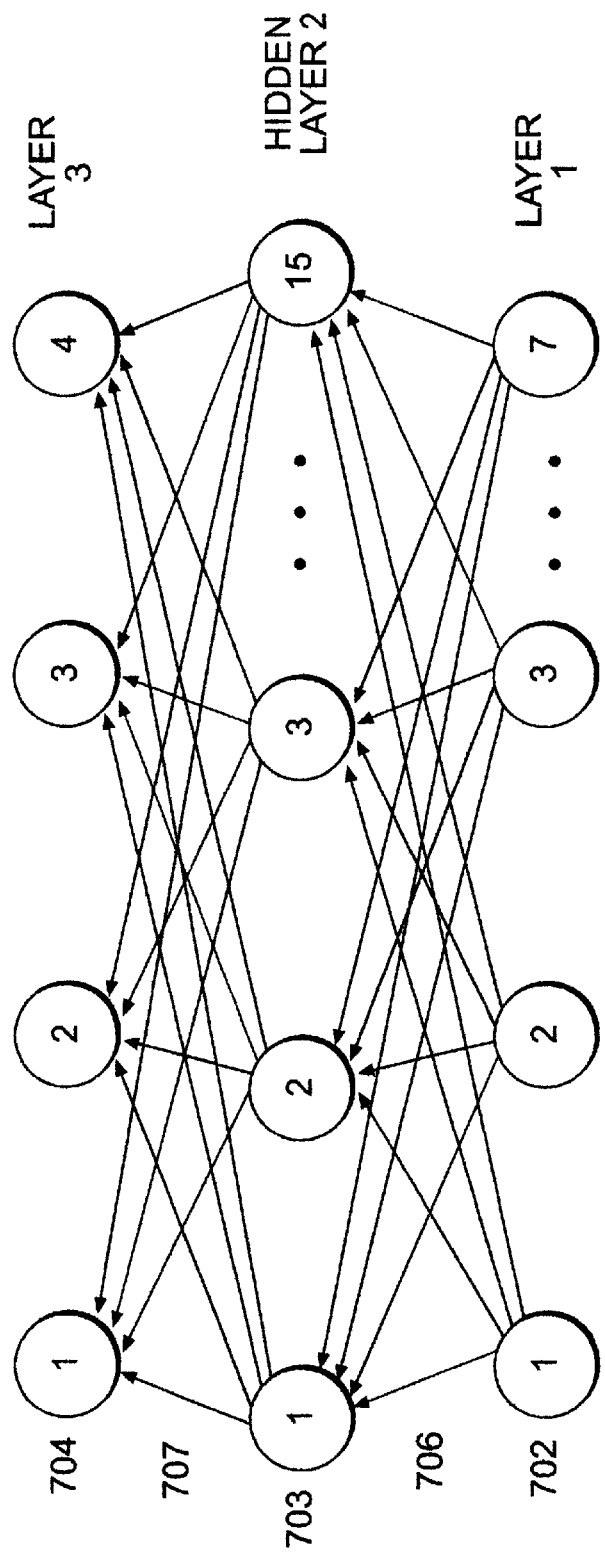
FIG. 7 shows the three-layer feedforward ANN as implemented in the prototype invention.

Referring now to FIG. 7, the input signals and strengths are represented by the input vector 701 and interconnection weight 706. The total input signal is calculated by summing the dot product of the input vector 701 and their weights 706 becoming the activation levels for Layer 2 at 703. The output vector 705 is computed by summing the dot product of the activation levels from Layer 2 at 703 and their weights 707. The commonly used nonlinear sigmoid function $1/(1+e^{-x})$ is then used to compute the activation levels. The resulting activation levels 704 are stored in the output vector 705.

Referring once again to FIG. 6, the resulting activation levels for the output layer are compared with the output vector from the training data input-output vector pair in function block 607. If the differences in the compared values is not within tolerance, then the ANN edge weights are adjusted, as needed, in function block 609. The tolerance levels are determined in the following manner.

The network error E is computed in function block 607 by subtracting the sum of the square of the actual output values $O_k$ from the target valued $d_k$ such that $$E = \frac{1}{2}\sum_{k=1}^{K}(d_k - o_k)^2.$$

For weight correction, this error is multiplied by the first derivative of the transfer function with respect to the interconnection weight, as in $$\nabla E = \frac{\partial E}{\partial w_{kj}}.$$

In order to approach the error surface minimum, the instantaneous gradient is multiplied by the learning rate n. For the purpose of the present invention, the learning rate n is set to 0.01. The weight correction of the present invention is therefore $$\Delta w_{kj} = -n(d_k - o_k)f'(net_k)y_j$$

where $f'(net_k)$ is the first derivative of the cost function of the output layer. This form allows the straightforward coding of the function into the software.

In either case, the input-output vector pair from the training data file is marked as visited in function block 610. We then test to determine whether all such vector pairs in the list have been visited in decision block 611. If not, the process continues at function block 604 and continues to process the list. If we have reached the end of the list, we test to determine whether the desired number of epochs have been processed in decision block 612. If so, the training process terminates at function block 613. Otherwise, all vector pairs in the training data file are marked as unvisited in function block 614 and we continue to process the file again at function block 604, beginning a new epoch. Remembering that when all of the training cases have passed through the network once at function block 611, the training has completed one epoch. Here, we train the data for 50,000 epochs in order to form a sufficient representation of the data in the network's interconnections.

Production (or Live Mode) Phase

Figure 8:
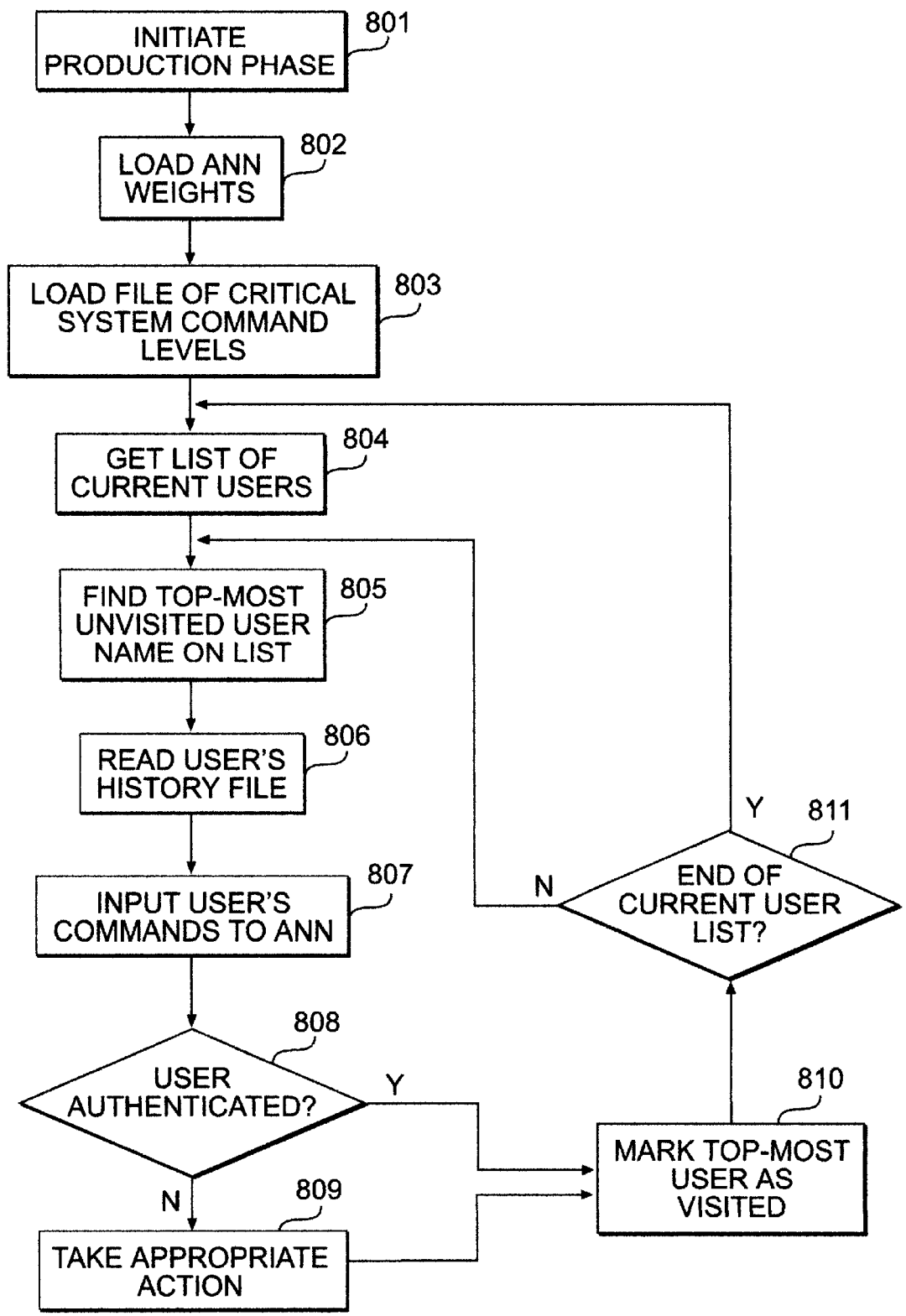
FIG. 8 is flow diagram of the production mode of the invention.

FIG. 8 shows a flow diagram of the production mode of the invention. This is the "live" phase of the invention. Once data has been collected and the ANN has been trained, we may now begin to authenticate users based on their activity. This phase of the invention is executed as a background process and is transparent to the user. As users login and start using the system, the authentication process will be triggered, and based on the level of implementation, suitable action will be taken for failed authentication. Although the prototype implementation displayed messages to a computer display screen, the invention can easily be implemented to automatically logoff the intruder or effect some other more severe reaction. Depending on the security needs of the actual computer system, the method of alert may be easily modified to cater to specific system requirements. The authentication mechanism can be expanded to classify additional levels of action. For instance, the ANN could be modified to classify its authentication into three categories to initiate a more customized reaction:

Yes—definitely the appropriate user.

No—definitely an intruder.

Yes/No—may or may not be the appropriate user.

For each of these values returned by the ANN, the action taken could be defined to suspend the user account or merely mail a message to the system administrator, warning of a potential intruder.

If the usage pattern is outside of the user's normal usage pattern, this triggers the system to react automatically. The reaction of the system is adjustable and will depend primarily on the nature and the degree of destructiveness of a particular command and the level of security awareness that the software is set for. Various levels of security are determined by the list of commands deemed critical by the system administrator.

Referring again to FIG. 8, the production phase is initiated by the system administrator in function block 801. The set of weights for the trained ANN are loaded from a file in function block 802. The set of system command labels for those commands deemed critical are loaded from a file in function block 803. The list of current users is then obtained in function block 804 using the finger command. The top-most unvisited user name on the list is read in function block 805. When a user logs in, the data is captured and converted into a character string and placed in the user history file. The user's history file, .sh_history, is read in function block 806. The user's commands and date/time information is introduced to the ANN as activation values for the ANN's input layer nodes in function block 807. All data fields are sent to the ANN in function block 807, with the exception of the userid, in the same format as that in the training file. We then check to see if this user is authenticated, or a likely intruder in decision block 808.

Remembering that the outputs range between 0.1 an 0.9, the network outputs are rounded to the nearest binary value (0 or 1) prior to checking for authentication in decision block 808. The security module of the software compares this output to the userid of the login decision block 808. If the number matches, then the system takes no action and awaits for the next login attempt. If the output does not match, the system annotates the log file to indicate the mismatch in function block 809 and optionally performs a predetermined action based on security mode and shell command executed also in function block 809. This action may be as innocuous as logging a message to a file, or it could be to log off the user automatically and block that userid from future logins until the system administrator resets a flag in the system. In any case, the top-most user on the list of current users is marked as visited in function block 810. We then check to determine whether we have reached the end of the current user list in decision block 811. If all of the current users on the list have been visited, the process branches back to block 804 to begin the authentication process with a new list of users. Otherwise, the process branches back to function block 805 and authentication is attempted for the next unvisited user on the list. The production mode runs as a background process, or daemon, and requires system administrator action to terminate.

While the invention uses a single ANN trained with all users, for large distributed systems with many users, it is contemplated that a number of ANNs could be used, each ANN used for a single user or set of users. These ANNs can reside on one machine or be distributed throughout the network. One skilled in the art could easily implement this variation for a custom system. There are performance advantages to this type of distribution as with the advantages of parallelism in processing.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of user authentication at the operating system level in multi-user computer systems comprising the steps:
   learning a user's normal command usage pattern using artificial intelligence techniques;
   monitoring and reporting on user command usage patterns; and
   using the reported user command usage patterns to determine when a user's commands do not follow with the normal command usage pattern.

2. A method of user authentication at the operating system level in multi-user computer systems as recited in claim 1, further comprising the steps of:
   checking a set of system security rules when a difference in the normal command usage pattern is detected; and
   automatically performing a predetermined action when command usage patterns are determined to be abnormal.

3. A method of user authentication at the operating system level in multi-user computer systems as recited in claim 2, wherein said predetermined action includes logging violations of the system security rules.

4. A method of user authentication at the operating system level in multi-user computer systems as recited in claim 2, wherein said predetermined action includes automatically excluding said user from further system access when an abnormal command usage pattern is detected.

5. A method of user authentication at the operating system level in multi-user computer systems as recited in claim 2, wherein said predetermined action includes automatically notifying the system administrator when abnormal command usage pattern is detected.

6. A method of user authentication at the operating system level in multi-user computer systems as recited in claim 1, wherein said operating system is the UNIX operating system.

7. A method of user authentication at the operating system level in multi-user computer systems as recited in claim 1, wherein the step of learning a user's normal command usage pattern is performed using an artificial neural network.

8. A method of user authentication at the operating system level in multi-user computer systems as recited in claim 7, further comprising the step of storing command usage patterns in the artificial neural.

9. A method of user authentication at the operating system level in multi-user computer systems comprising the steps of:
   learning a user's normal usage pattern using artificial intelligence techniques using a plurality of individual artificial neural networks distributed throughout the system;
   monitoring and reporting on user usage patterns; and
   using the reported user usage patterns to determine when a user's commands do not follow with the normal usage pattern.

10. A method of user authentication as recited in claim 9, further comprising the step of storing usage patterns in the artificial neural networks in a form which is generally indecipherable to intruders.

11. A method of user authentication at the operating system level in multi-user computer systems as recited in claim 1, wherein the step of monitoring is performed at a minimum of two threshold levels of security.

12. A method of user authentication at the operating system level in multi-user computer systems as recited in claim 1, wherein the step of learning a user's normal command usage pattern is performed using a specialized expansion card in a computer system, which expansion card embodies the artificial neural network.

13. A method of user authentication at the operating system level in multi-user computer systems as recited in claim 1, wherein the step of monitoring a user's normal command usage pattern is performed using a specialized expansion card in a computer system, which expansion card embodies the artificial neural network.

14. A security tool for user authentication of users in a multi-user computer system comprising:

means for capturing user usage patterns at an operating system level of the multi-user computer system;

an artificial neural network having a training mode and a production mode set by the operating system, said artificial neural network in the training mode learning command usage patterns of users of the computer system and in the production mode monitoring and reporting on user command usage patterns; and means responsive to an output of the artificial neural network in the production mode for determining at the operating system level, based on the reported user command usage patterns, when a user's commands do not follow a normal command usage pattern.

15. A security tool for user authentication of users in a multi-user computer system as recited in claim 14, further comprising:

means for checking a set of system security rules when a difference in the normal command usage pattern is detected; and means for automatically performing a predetermined action when command usage patterns are determined to be abnormal.

16. A security tool for user authentication of users in a multi-user computer system as recited in claim 15, wherein said predetermined action includes logging violations of the system security rules.

17. A security tool for user authentication of users in a multi-user computer system as recited in claim 15, wherein said predetermined action includes automatically excluding said user from further system access when abnormal command usage pattern is detected.

18. A security tool for user authentication of users in a multi-user computer system as recited in claim 15, wherein said predetermined action includes automatically notifying the system administrator when abnormal command usage pattern is detected.

19. A security tool for user authentication of users in a multi-user computer system as recited in claim 14, wherein said artificial neural network is implemented in a specialized expansion card for a computer system.

* * * * *